United States Patent [19]

Mills

[11] Patent Number: 5,056,548
[45] Date of Patent: Oct. 15, 1991

[54] CHECK VALVE ASSEMBLY WITH REMOVABLE SEAT

[75] Inventor: Maury J. Mills, Oklahoma City, Okla.

[73] Assignee: KF Industries, Inc., Oklahoma City, Okla.

[21] Appl. No.: 596,508

[22] Filed: Oct. 12, 1990

[51] Int. Cl.$^5$ .............................................. F16K 15/03
[52] U.S. Cl. .................................. 137/15; 137/527.2; 251/363
[58] Field of Search ...................... 137/15, 315, 527.2, 137/527.8; 251/360, 363

[56] References Cited

U.S. PATENT DOCUMENTS 3,955,592 3/1976 Guyton ......................... 137/527.8 X
4,246,928 1/1981 Burns .............................. 251/360 X

*Primary Examiner*—Robert G. Nilson
*Attorney, Agent, or Firm*—Epstein, Edell & Retzer

[57] ABSTRACT

A removable valve seat has a peripheral annular flange retained between an annular shoulder in a flow passage and a pair of retainer pins slidably received in bores defined in the valve body. The pins are not threadedly or otherwise engaged in the bores but instead extend beyond the bore termini toward the valve access opening and are prevented from substantial axial displacement by a collar projecting into the access opening from a bonnet. The collar also precludes clapper mounting pins from being dislodged from open hanger recesses disposed in a hanger surface. Removal of the valve seat and other components are readily effected via the access opening by removing the cover, lifting the clapper out from the hanger recess, sliding the retainer pins out from their respective bores and then withdrawing the valve seat out of its flow passage.

26 Claims, 2 Drawing Sheets

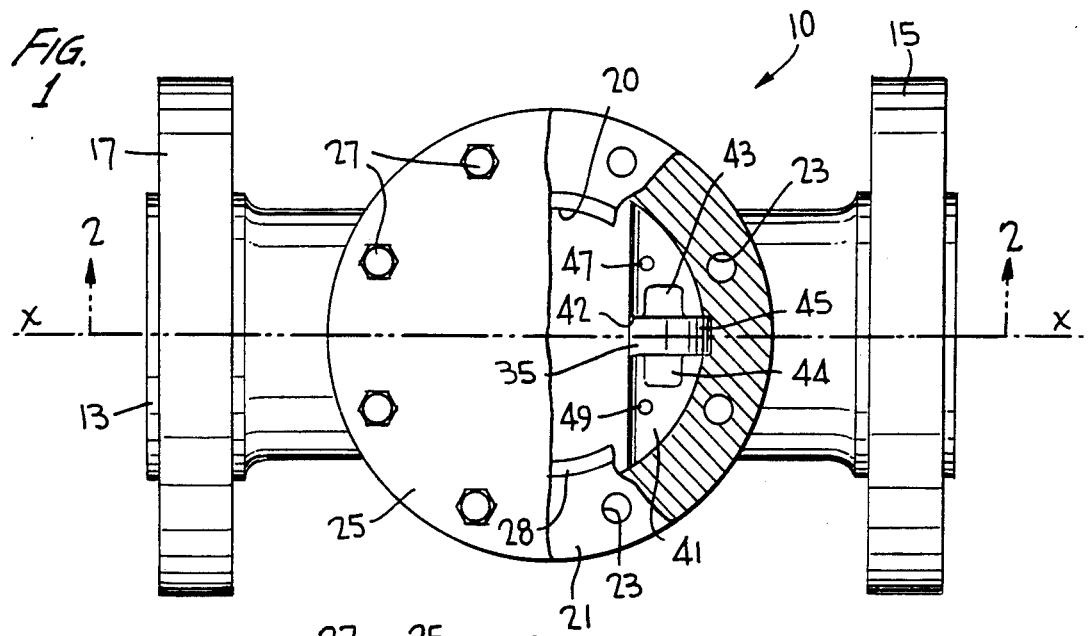
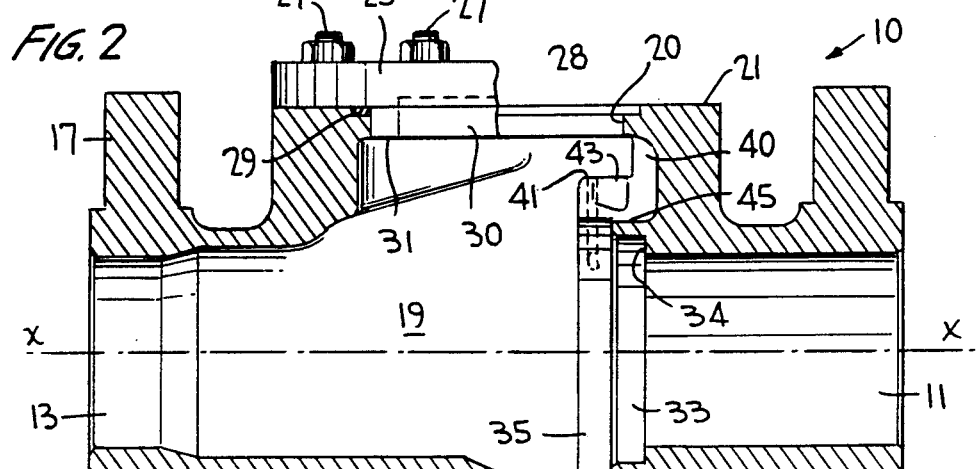
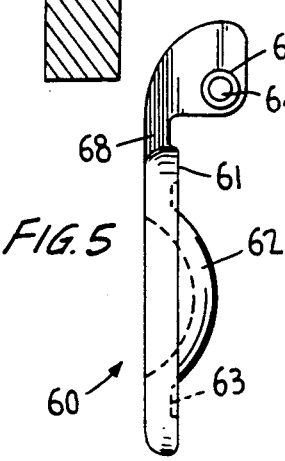
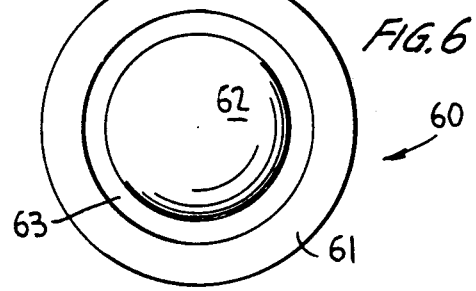

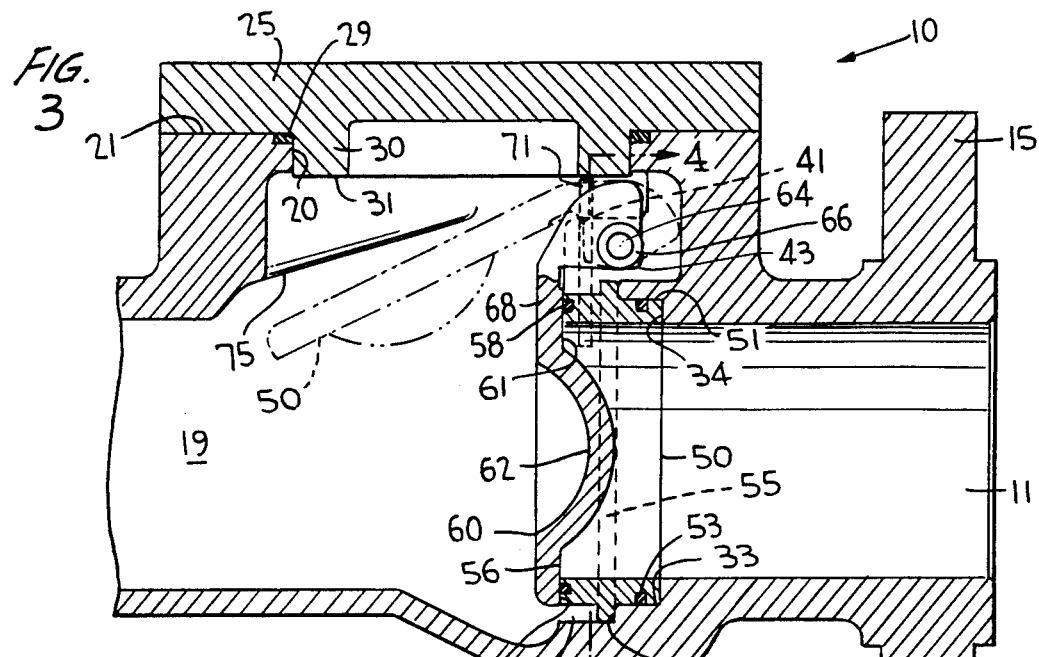
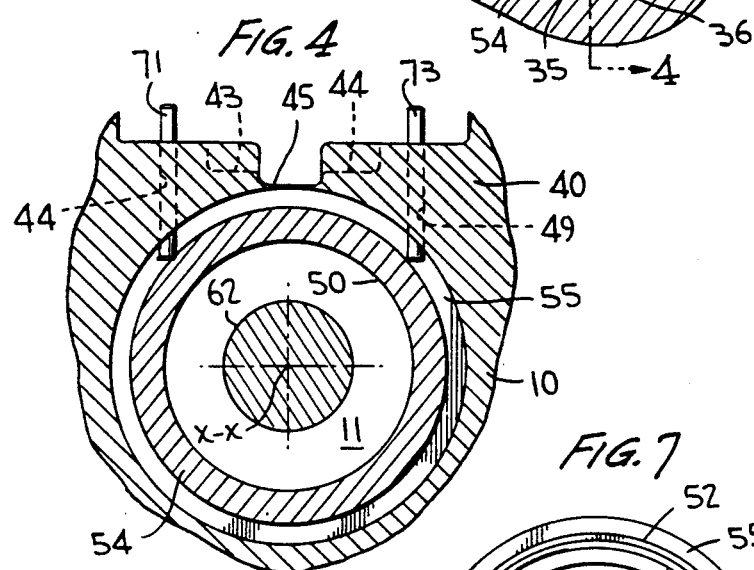
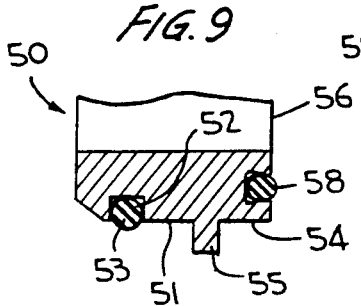
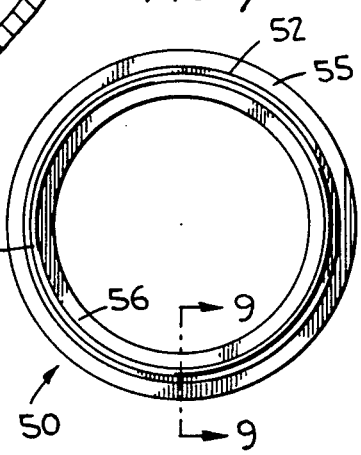
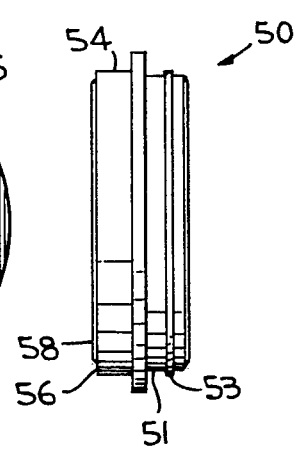

CHECK VALVE ASSEMBLY WITH REMOVABLE SEAT

BACKGROUND OF THE INVENTION

1. Technical Field

The present invention relates to check valves having a removable valve seat and, more particularly, to an improved method and apparatus for positionally securing and removing the valve seat and its associated clapper.

2. Discussion of the Prior Art

Check valves of the clapper type are often constructed in a manner requiring the valve housing to be disassembled in order to provide access to the valve interior for maintenance and repair. For example, in U.S. Pat. No. 3,955,592 (Guyton), the check valve embodiment illustrated in FIG. 1 therein has a two-part housing wherein the inlet port is provided in one housing part and the axially aligned outlet port is defined in the other housing part. Once the housing parts are disassembled, the clapper assembly can be lifted out of a specially designed hanger unit and, thereafter, the valve seat can be threadedly disengaged from the first body part. Another valve, illustrated in FIG. 6 of the Guyton patent, requires the same two body parts but, once those parts are disassembled, the clapper and hanger assembly can only be removed by removing threaded bolts, and the valve seat can be removed only by loosening a recessed set screw that radially bears against the seat periphery in an annual groove defined in the seat. The set screw and valve seat are inaccessible when the valve body parts are assembled. In many cases these valves are installed at sites where disassembly of the body parts is difficult at best and, in any event, requires the flow line to be shut down for long periods of time during maintenance and repair.

Certain prior art check valves are designed so that only a bonnet or cover need be removed to provide access to the housing interior, an example of such a valve being illustrated in FIG. 8 of the aforementioned Guyton patent. In that valve, once the bonnet is removed the clapper and hanger assembly can be removed by unscrewing a pair of threaded bolts that secure the hanger to the valve body. The valve seat is held in place by a recessed set screw bearing radially against the base of an annular groove defined in the valve periphery. Although this valve embodiment provides access to the valve interior without requiring the valve body to be disassembled, the removal of the valve seat is quite time consuming since the clapper and its hanger must first be threadedly disengaged. Then, the set screw that retains the seat must be withdrawn from the annular groove in the seat periphery. This procedure, although more efficient than disassembling the overall valve body, is nevertheless time consuming. Moreover, the set screw contacts the valve seat at a single location permitting pitch and yaw rotation of the seat relative to the flow path axis. Further, the annular groove defined in the valve seat is wider than the set screw thereby permitting axial displacement of the seat relative to the set screw, a disadvantage that is aggravated by gradual loosening of the set screw due to vibration over a period of time. Any movement of the valve seat changes the mutual orientations of the clapper and seat, thereby jeopardizing the fluid seal between these elements.

It is known that valve seats for expanding gate valves can be removably mounted in the valve body with the aid of a pair of elongated retainer pins tangentially engaging the seat at diametrically opposed locations in an annular groove of the seat. For example, see U.S. Pat. No. 4,246,928 (Burns et al). The retainer pins are received in respective passages formed in the valve body, and threaded counterbores engage the threaded proximal ends of the pins. Each retainer pin has a flattened cut away portion where it engages the seat groove. This arrangement is designed to permit the seats to move axially to accommodate the varying positions of the gate members. In addition, even though the retainer pins can be loosened without removing the valve bonnet, removal of the valve seat requires the bonnet and its attached valve actuator assembly to be removed before the gate members can be likewise removed to provide access to the valve seats. Further, the requirement for separate passages for the retainer pins necessitates additional sealing gaskets and increases the possibility of leakage.

OBJECTS AND SUMMARY OF THE INVENTION

It is an object of the present invention to provide an improved check valve wherein a valve seat may be quickly and easily removed for maintenance and repair but is nevertheless held securely in place when in use.

It is another object of the present invention to provide an improved check valve assembly of the type wherein access to the valve chamber is provided by a removable bonnet so that the clapper and valve seat can be easily removed and replaced.

A further object of the present invention is to provide an improved method and apparatus for securing a valve seat in a valve body in a manner such that the seat can be easily and quickly removed for maintenance and repair but is securely held in place when in use.

In accordance with the present invention, a valve seat is provided with an annular flange projecting radially outward from the seat. The upstream surface of the flange abuts an annular shoulder in the valve inlet port to establish the desired seat position. A pair of retainer pins is slidably received in a respective pair of retainer bores defined in the valve body from a hanger surface facing the valve access opening and exposed when the bonnet is removed. The pins contact the downstream surface of the seat flange and the radially outward facing cylindrical surface of the seat located immediately downstream of the flange. Movement of the retainer pins out of contact with the valve seat is prevented by a collar on the bonnet projecting inwardly from the access opening to a location adjacent the pin ends. The retainer pins are disposed in spaced parallel relation in a plane oriented perpendicular to the longitudinal flow axis of the valve and parallel to the axis of the access port.

The clapper hanger is defined as contoured recesses in the hanger surface. The bonnet collar prevents the clapper from being dislodged from the hanger recess when the bonnet is in place. However, when the bonnet is removed, the clapper can be easily lifted out of the hanger recess and withdrawn through the valve access opening. Likewise, the retainer pins can be slid out of their bores and removed, whereupon the valve seat can be pulled axially out of the valve inlet port and removed from the valve chamber through the access port. Insertion of the clapper, seat and retainer pins is effected with similar ease.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components, and wherein:

FIG. 1 is a top view in plan and partial section of the valve body and bonnet of a valve assembly constructed according to the present invention;

FIG. 2 is an elevational view in section taken along lines 2—2 of FIG. 1;

FIG. 3 is a detailed elevational view in section of a portion of the valve of FIG. 1 showing the valve seat and clapper in operational orientation;

FIG. 4 is a view in section taken along lines 4—4 of FIG. 3;

FIG. 5 is a side view in elevation of the clapper element of the valve of FIGS. 1 and 4;

FIG. 6 is a front view in elevational of the clapper element of FIG. 5;

FIG. 7 is a front view in elevation of the valve seat employed in the valve assembly of FIGS. 1 and 4;

FIG. 8 is a side view in elevational of the valve seat of FIG. 7; and

FIG. 9 is a detailed view in section of the valve seat taken along lines 9—9 of FIG. 7.

DESCRIPTION OF THE PREFERRED EMBODIMENT

Referring to the drawings in greater detail, a check valve assembly according to the present invention includes a one-piece valve body 10 having an inlet port 11 and an outlet port 13 in substantial coaxial alignment along the valve flow axis X—X. Annular flanges 15 and 17 extend radially outward from inlet port 11 and outlet port 13, respectively, as integral parts of the valve body. Flanges 15 and 17 provide means by which the valve assembly may be secured in a pipeline, or the like, between upstream and downstream conduit sections. A valve chamber 19 constitutes the hollow interior of valve body 10 and serves as a flow communication region between the inlet and outlet ports. Access to the valve chamber is provided by an access opening or port 20 extending transversely of the flow axis X—X. Access opening 20 is surrounded at the outer surface of the valve body by an annular flange 21 into which multiple tapped angularly spaced bores 23 are defined. A circular bonnet or cover 25, having an outer diameter substantially equal to that of flange 21, sits atop the flange and has multiple bores defined therethrough at spaced angular locations that are alignable with the tapped bores 23 in the flange. Multiple threaded bolts 27 extend through the bonnet bores into threaded engagement with bores 23 to permit bonnet 25 to be selectively secured in place over access opening 20. An annular recess 28 is defined along the radially inner edge or lip of the mating surface of flange 21 to receive a gasket 29 providing a pressure seal between bonnet 25 and the flange.

Bonnet 25 includes a collar 30 projecting into access opening 20 from the interiorly facing surface of the bonnet. Collar 30 is coaxially disposed with respect to the access opening and has an outer diameter that is considerably smaller than the outer diameter of the bonnet and slightly smaller than the diameter of access opening 20 so that the collar can easily slid into and out of the access opening. When bonnet 25 is disposed over access opening 20, the interiorly facing annular surface 31 of collar 30 faces valve chamber 19 and is oriented substantially parallel to flow axis X—X.

The interior or downstream end of inlet port 11 is diametrically widened in two adjacent sections 33 and 35 to define a valve seat receiver. Specifically, inlet port 11 has a substantially constant diameter throughout most of its length and then widens to a somewhat larger diameter seat receiver section 33 near its downstream end. The transition between the constant diameter portion of the inlet port and section 33 is an annular shoulder 34 facing downstream toward valve chamber 19. Seat receiver section 35 has a still larger diameter and is disposed between section 33 and the downstream end of inlet port 11. The transition between sections 33 and 35 is an annular shoulder 36 facing downstream toward the valve chamber. Seat receiver sections 33 and 35 have short axial lengths relative to the overall axial length of inlet port 11.

The valve body portion 40 surrounding seat receiver sections 33, 35 extends into valve chamber 19 to define a hanger region that is visible and accessible from access opening 20. Specifically, body portion 40 has a planar hanger surface 41 facing access opening 20 and extending into valve chamber 19 a sufficient distance beyond the projection of the inner rim of flange 21 to render surface 41 both visible and accessible through access opening 20 when bonnet 25 is removed. Surface 41 is symmetrical with respect to flow axis X—X and has a generally rectangular segment 42 cut out of its downstream end and extending through the full depth of body portion 40 to seat retainer section 35 of inlet port 11. The length of segment 42 along the flow axis X—X substantially corresponds to the axial length of section 35. A pair of generally rectangular hanger recesses 43, 44 are defined in surface 41 on respective transverse sides of cut out segment 42. The hanger recesses 43, 44 are disposed slightly inboard of the downstream edge of hanger surface 41 and are bounded along three sides and along their bases by body portion 40. These recesses are open at their mutually facing sides and along hanger surface 41. At the inboard termination of cut out segment 42, surface 41 is provided with an additional recess 45 having a depth into body portion 40 greater than the depth of recesses 43, 44. The forward or downstream facing edge of body portion 40 at recess 45 (i.e., at the innermost boundary of cut out region 42) constitutes part of annular shoulder 36 marking the transition between seat retainer sections 33 and 35 in inlet port 11.

Portions of hanger recesses 43 and 44 are disposed at a location on hanger surface 41 that is radially inward of the access opening 20 so as to be in spaced juxtaposition with collar 31 on bonnet 25. Also in spaced juxtaposition with collar 31 are a pair of parallel retention bores 47, 49 defined through body portion 40 from surface 41 to seat retainer section 35 in inlet port 11. Bores 47, 49 open into section 35 at a location downstream of and spaced from shoulder 36 and are each transversely spaced further from flow axis X—X than are recesses 43, 44. The bores are preferably transversely spaced from one another by the greatest possible distance permitted by the limitation that they must not extend beyond the diametric confines of access opening flange 20.

The valve assembly as thus far described includes only two main structural components, namely valve body 10 and bonnet 25, the latter serving to cover and seal the access opening 20. In order to provide the check valve function for the unit, the valve assembly also includes two functional components, namely valve seat 50 and clapper 60. The valve seat, as best illustrated in FIGS. 3, 4, 7, 8 and 9, is an annular member having an inner diameter substantially equal to the inner diameter of the elongated upstream portion of inlet port 11. The periphery of valve seat 50 is contoured to fit into seat retainer sections 33 and 35 of the inlet port. In particular, the valve seat periphery includes an upstream section 51 having a diameter substantially equal to the diameter of upstream seat retainer section 33 whereby the valve seat may fit snugly in that seat retainer section. To this end, "substantially equal" means that the diameter of retainer section 33 is typically no more than a few thousandths of an inch larger than the outer diameter of upstream seat segment 51. An annular recess 52 is defined in the periphery of upstream seat segment 51 for receiving an O-ring 53 to effect a pressure seal between the seat and retainer section 33. The axial length of upstream seat section 51 is equal to or less than the axial length of upstream retainer section 33 in inlet port 11. If desired, and as shown in the illustrated embodiment, the upstream edge of the outer periphery of seat segment 51 may be bevelled to facilitate insertion of the seat into seat retainer section 33.

The periphery of valve seat 50 also includes a downstream section 54 of larger diameter than upstream segment 51 and axially separated therefrom by an annular retainer flange 55 of larger outside diameter than both of segments 51 and 54. The outside diameter of flange 55 is just slightly smaller than the diameter of upstream seat retainer section 35 in inlet port 11, the difference typically being on the order of a tenth of an inch or less. Thus, when valve seat 50 is properly positioned in inlet port 11, the outer edge of flange 55 fits closely in upstream retainer section 35, and the upstream facing surface of the flange abuts shoulder 36. In addition, the periphery of downstream seat section 54 is spaced from the wall of retainer section 35 by an annular gap substantially corresponding in radial length to the radial length of flange 55. The combined axial length of flange 55 and upstream seat section 54 is such that the downstream facing surface 56 of the seat is coplanar with or upstream of the downstream end of retainer section 35; that is, the valve seat does not project into the valve chamber 19 beyond the terminus of inlet port 11.

An annular groove 57 is defined in downstream surface 56 of the valve seat in concentric relation to the valve seat opening. Groove 57 has a generally dovetail cross-sectional configuration such that it is wider at its base than at its mouth. An oversize O-ring 58 is resiliently engaged within groove 57 so as to project slightly downstream of surface 56. O-ring 58 provides a pressure seal between the seat and clapper member 60, as described below. The dovetail cross-section of groove 57 assures positive retention of the oversize O-ring 58 in spite of repeated impact against the O-ring by the clapper 60.

Valve seat 50 is securely retained in seat retainer sections 33, 35 by a pair of cylindrical retainer pins 71, 73 slidably disposed in respective retention bores 47, 49. Each retainer pin is smooth along its entire periphery to facilitate sliding within its respective bore. The length of the retainer pins 71, 73 is sufficient to extend entirely through its retention bore whereby its inserted end extends through retainer section 35 of inlet port 11 to abut the periphery of downstream valve seat segment 54. In addition, part of the cylindrical surface of each pin 71, 73 proximate its inserted end abuts the downstream surface of flange 55. The flange is thus securely held in place between the two retainer pins located adjacent its downstream surface and shoulder 36 adjacent its upstream surface. The retainer pins are prevented from substantial longitudinal movement by the valve seat retainer section 54 abutting one end, and surface 31 of collar 30 abutting or disposed proximate their opposite ends.

It must be stressed that retention bores 47, 49 are required to be located such that their respective retainer pins 71, 73 are accessible via access port 20 to permit the pins to be easily slid out of the bores without requiring the disengagement of threads or other engagement means. In addition, the pins must be constrained when the valve is in use so as to be prevented from inadvertently sliding sufficiently in the bores to no longer retain the valve seat flange 55 in position. So long as these requirements are met, bores 47 and 49 may be positioned and oriented other than as shown and described above. However, the most desirable position is achieved when the bores are spaced as far from the flow axis X—X as possible to maximize their angular spacing along seat segment 54. The perpendicular orientation of the bores relative to hanger surface 41 is also desirable since it facilitates machining of the bores while at the same time minimizing the required length of pin 71, 73 and maximizing their spacing along the valve seat periphery. For example, if bores 47, 49 were oriented at an angle to surface 41 and radially to segment 54 at the contact points, the pin length might be shorter but the contact points would be closer together. If the bores were oriented at an angle to surface 41 and tangential to segment 54 at the contact points, the bores would be long and difficult to machine. In addition the exposed ends of the pins would tend to interfere with one another. Accordingly, the most advantageous position of the bores is just within the projection of access opening 20 onto surface 41, and the most advantageous orientation is perpendicular to that surface. Under such circumstances, the angular spacing between the pin contact points along the periphery of segment 54 is less than 180° and typically is on the order of 150° or less.

Clapper 60, as best illustrated in FIGS. 3, 5 and 6, is substantially dome-like in configuration with an annular rim 61 surrounding a central spherical segment 62 having a concave downstream surface and a convex upstream surface. The bulging convex surface of spherical segment 62 is surrounded by an annular recess 63. A support arm 68 extends radially from rim 61 and then bends in an upstream direction to form an enlarged distal end from opposite sides of which a pair of coaxial clapper pins 64, 65 extend. The clapper pins and support arm are preferably integral with the clapper dome-like portion and rim to form a single piece. Clapper pins 64, 65 extend transversely of the flow direction through the valve and are disposed within respective bushings 66, 67 adapted to fit and be retained in respective hanger recesses 43, 44 in surface 41. When so supported, and with the valve assembly in the orientation shown in FIG. 3 (i.e., access opening flange 21 facing upward), the clapper 60 hangs downwardly with arm 68 partially disposed in cut away region 42 of body portion 40 between the two hanger recesses 43, 44. Spherical segment 62 of the clapper serves as a counter weight urging the clapper against the downstream surface 56 of valve seat 50. In the absence of flow into the valve from inlet port 11, spherical segment 62 projects into the valve seat opening while clapper rim 61 is urged against O-ring 58, thereby preventing flow from valve chamber 19 upstream into the inlet port.

Downstream flow from inlet port 11 into the valve chamber causes clapper 60 to pivot in the hanger recesses 43, 44 to its open position as illustrated by the dashed lines in FIG. 3. The extent to which the clapper can be opened is limited by a stop 75 contoured in the interior chamber wall in the region of access opening 20, thereby defining the fully opened valve position.

Clapper pins 64, 65 and their respective bushings 66, 67 are retained in the open hanger recesses 43, 44, respectively, by the proximity of collar surface 31 to hanger surface 41. Specifically, the spacing between surfaces 31 and 41 is less than the diameter of bushings 66 and 67 so that the bushings cannot fall out of recesses 43 and 44 no matter what the orientation of the valve assembly and regardless of the extent to which the valve clapper is pivoted open.

The structural relationships described above have numerous advantages. For example, retainer pins 71, 73 effectively trap the seat flange 55 against shoulder 36 to prevent substantial axial movement of the valve seat. The angular spacing between the pin contact points on the flange prevent "yaw" rotation of the seat (i.e., rotation about a vertical axis perpendicular to the flow axis X—X). The holding of seat flange 55 adjacent shoulder 36 by retainer pins 71, 73 also minimizes any tendency toward "pitch" rotation of the seat (i.e., rotation about an axis perpendicular to flow axis X—X and into the plane of the drawing in FIG. 3).

In addition to providing secure and positive retention of removable seat 50, the present invention permits rapid and easy removal of both the seat and clapper 60 from the valve housing for purposes of repair and maintenance. Specifically, once bonnet 25 is removed, clapper 60 may simply be lifted out of the housing through access opening 20 without any need to threadedly disengage parts. This is possible because the clapper pins 64, 65 and their respective bushings 66, 67 are only retained in respective hanger recesses 43, 44 by surface 31 of collar 30. Removal of the collar as part of the bonnet leaves the entire clapper, including the clapper pins and their bushings, exposed and accessible because the entire clapper resides within the circular area bounded by the vertical projection of access opening 20. Retainer pins 71, 73 are similarly exposed and accessible and, because they are merely slidable and not threadedly or otherwise engaged in bores 47, 49, are easily and quickly withdrawn from the housing. Once the pins have been withdrawn, seat 50 can be axially slid out of retainer sections 33, 35 of inlet port 11 and removed from the housing via access opening 20. In this regar, the downstream end of inlet port 11, including retainer sections 33, 35, projects so as to be accessible via the access opening. The diameter of access opening 20 is at least slightly larger than the maximum outside diameter of seat 50 (i.e., the outside diameter of flange 55) so that the seat can fit through the access opening.

It will be appreciated that the dovetail groove 57 and its retained enlarged O-ring 58 may be disposed on the clapper 60 rather than on seat 50 and still provide the same sealing function between the clapper and valve seat. In addition, the illustrated retainer pins 71, 73 have circular end surfaces whereby only a short arcuate segment of those surfaces contacts seat segment 54. It will be appreciated that at least the inserted end of each retainer pin may be contoured to match the contour of seat segment 54 so as to be positionable flush against that section. In this regard it is still necessary that the non-inserted ends of the pins be disposed in sufficiently close proximity to collar surface 31 to prevent inadvertent axial displacement of the pins out of contact with flange 55.

The valve seat 50 described above is provided with a radially enlarged flange to serve the seat retention function and an upstream segment 51 with groove 52 and O-ring 53 to provide a seal between the valve seat and the inlet port. It will be appreciated that the upstream segment 51 can be eliminated whereby a groove and O-ring can be provided in the flange periphery to effect the sealing function. In such an arrangement the retainer section 33 of inlet port 11 is eliminated, leaving only the single enlarged retainer section 35 with shoulder 36 demarking the transition between that section and the remainder of the inlet port. The downstream surface of the flange constitutes the upstream end of the seat, and the flange would typically be axially enlarged to provide adequate room for the groove and O-ring.

By way of example only, and not to be construed as limiting the scope of the present invention, the following nominal dimensions of relevant components of the invention were utilized in a properly functioning embodiment:

| | |
|---|---|
| Diameter of upstream part of inlet port 11 | 4.035 inches |
| Diameter of retainer section 33 | 4.827 inches |
| Diameter of retainer section 35 | 5.500 inches |
| Axial length of retainer section 33 | 0.625 inches |
| Axial length of retainer section 35 | 0.750 inches |
| Inner diameter of valve seat 50 | 4.035 inches |
| Outside diameter of seat segment 51 | 4.820 inches |
| Outside diameter of flange 55 | 5.375 inches |
| Outside diameter of seat segment 54 | 4.975 inches |
| Axial length of seat segment 51 | 0.690 inches |
| Axial length of flange 55 | 0.150 inches |
| Axial length of seat segment 54 | 0.410 inches |
| Diameter of access opening 20 | 5.410 inches |
| Diameter of retainer bores 47, 49 | 21/64 inches |
| Spacing between bores 47 and 49 on centers | 1.500 inches |
| Diameter of retainer pins 71, 73 | 5/16 inches |
| Axial spacing between annular shoulder 36 and centers of retainer bores 47, 49 | 0.405 inches |

From the foregoing it will be appreciated that the invention makes available a novel arrangement for retaining a valve seat in a valve housing so that it may be easily and quickly removed for purposes of maintenance and repair. The invention is particularly useful for check valves of the clapper type wherein the removable mounting of the valve seat combines with easily removable clapper mounting structure to reduce the overall time for removing the operating components of the check valve.

Having described a preferred embodiment of a new and improved method and apparatus check valve assembly with removable seat in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. An improved valve assembly comprising:
    a valve body having an interior chamber, an access port opening into said chamber, and inlet and outlet ports in individual flow communication with said chamber;
    actuator means secured in said valve chamber for displacement between open and closed positions relative to said inlet port;
    wherein said inlet port is a generally cylindrical passage having a longitudinal axis and a downstream end in which seat retaining means is defined, said seat retaining means including an annular shoulder facing downstream toward said valve chamber;
    an annular valve seat disposed concentrically about said longitudinal axis in said seat retainer means and in cooperative relation with said actuator means such that said actuator means in said closed position blocks flow communication between said inlet port and said valve chamber, but in said open position permits flow communication between said inlet port and said valve chamber through said valve seat;
    wherein said valve seat includes a radially extending flange disposed annularly about its periphery, said flange having an upstream surface abutting said annular shoulder and a downstream surface facing said valve chamber;
    first and second retainer bores defined in said valve body in spaced relation and in a plane oriented perpendicular to said longitudinal axis, wherein said first and second retainer bores each have a first end opening at said seat retaining means in said inlet part at respective first and second locations immediately downstream of said flange, said bores each having a second end disposed to be visible and accessible from said access port, wherein the angular spacing along the seat retaining means between said first and second locations is less than 180°; and
    first and second retainer pins slidably disposed in said first and second retainer bores, respectively, without being secured in said bores, for contacting said downstream surface of said flange to thereby retain the flange between said annular shoulder and said pin.

2. The valve seat according to claim 1 wherein said inlet port is generally cylindrical with a substantially constant diameter from its upstream end to said seat retaining means;
    wherein said seat retaining means includes: an upstream section of a first diameter larger than said constant diameter; and a downstream section of a second diameter larger than said first diameter, wherein said annular shoulder demarks a transition between said upstream and downstream sections;
    wherein said valve seat flange has an outside diameter slightly smaller than said second diameter but larger than said first diameter;
    wherein said valve seat includes: an upstream segment having an outside diameter closely matching said first diameter such that said upstream segment closely fits into said upstream section of said seat retaining means, and having an axial length no longer than said length of said upstream section of said seat retaining means so that the upstream surface of said flange abuts said annular shoulder; and a downstream segment having a diameter smaller than said second diameter to provide an annular gap between the downstream segment and the surrounding downstream section of the seat retaining means, and such that said retainer pins extend through said retainer bores and said gap to contact said downstream segment.

3. The valve assembly according to claim 2 wherein said upstream segment of said valve seat has an annular peripheral groove defined therein, and wherein an O-ring is disposed in said peripheral groove to effect a seal between said upstream segment of said valve seat and the upstream section of said seat retaining means.

4. The valve assembly according to claim 1 wherein said valve seat includes a cylindrical downstream segment having a diameter smaller than the diametrically enlarged seat retaining means to define an annular gap between the downstream segment and the seat retaining means and through which said retainer pins extend to contact the periphery of the downstream segment.

5. The valve assembly according to claim 4 further comprising sealing means for providing a pressure seal between said valve seat and said retaining means.

6. The valve assembly according to claim 5 further including an interior body portion projecting into said valve chamber about said seat retaining means and having an access surface facing said access port, wherein said retainer bores extend from said access surface through said interior body portion; and
    wherein said retainer pins are sufficiently long to extend beyond said access surface when inserted in said retainer bores into contact with said valve seat.

7. The valve assembly according to claim 6 further comprising a bonnet for covering said access port in pressure sealing relation, said bonnet having a projecting portion extending through said access port into spaced relation with said access surface such that the projecting portion of the bonnet prevents said retainer pins from moving axial out of adjacency with said valve seat flange.

8. The valve assembly according to claim 7 wherein said actuator means is a clapper unit having pivot means pivotably mounted in an open hanger recess defined in said access surface, and wherein said projecting portion of said bonnet is disposed sufficiently proximate said access surface to prevent said pivot means from being dislodged from said hanger recess.

9. The valve assembly according to claim 4 wherein said valve seat has an annular downstream facing surface disposed to be abutted by said actuator means in the closed position of said valve, said downstream facing surface having an annular dovetail groove defined therein with a dovetail cross-section and an oversize O-ring wedged in said annular dovetail groove to provide a pressure seal between said actuator means and said valve seat.

11

10. The valve assembly according to claim 1 further including an interior body portion projecting into said valve chamber about said seat retaining means and having an access surface facing said access port, wherein said retainer bores extend from said access surface through said interior body portion; and wherein said retainer pins are sufficiently long to extend beyond said access surface when inserted in said retainer bores into contact with said valve seat.

11. The valve assembly according to claim 10 further comprising a bonnet for covering said access port in pressure sealing relation, said bonnet having a projecting portion extending through said access port into spaced relation with said access surface such that the projecting portion of the bonnet prevents said retainer pins from moving axial out of adjacency with said valve seat flange.

12. The valve assembly according to claim 11 wherein said actuator means is a clapper unit having pivot means pivotably mounted in an open hanger recess defined in said access surface, and wherein said projecting portion of said bonnet is disposed sufficiently proximate said access surface to prevent said pivot means from being dislodged from said hanger recess.

13. A check valve of the type wherein a clapper is pivotably mounted to be movable between an open position wherein the clapper is spaced from a valve seat disposed in an inlet port to provide flow communication between the inlet port and a valve chamber, and a closed position wherein the clapper abuts the valve seat to block flow communication between the inlet port and the valve chamber, and wherein the clapper and the valve seat are removably mounted so as to be capable of being withdrawn from the valve chamber via an access port having a removable bonnet, an improved apparatus for retaining the valve seat comprising:

a cylindrical seat retaining section defined at a downstream end of said inlet port and having a first diameter larger than upstream portions of said inlet port, wherein an annular downstream-facing shoulder demarks a transition between said seat retaining section and said upstream portions of said inlet port;

an annular flange projecting radially from said valve seat and having an outer diameter constituting the largest diameter of said valve seat, said outer diameter being larger than said upstream portions of said inlet port but smaller than said first diameter, wherein said flange has an upstream surface disposed adjacent said shoulder and a downstream surface facing said valve chamber;

wherein said valve seat includes a downstream section extending downstream from said flange and having an outer diameter smaller than said first diameter;

an interior body portion of said valve having a hanger surface that is both visible and accessible through said access port when said bonnet is removed, said body portion having at least a first retainer bore defined entirely therethrough from said hanger surface and opening into said seat retaining section at a first location just downstream of the upstream surface of said valve seat flange;

at least a first retainer pin slidably disposed in said first retainer bore and having a length greater than the length of said bore such that one end of the pin abuts said valve seat downstream section while a portion of the pin retains said flange between said pin and said annular shoulder, and such that a second end of said pin extends beyond said hanger surface; and stop means disposed on said bonnet for projecting into said access opening adjacent the second end of said pin to trap said pin between said stop means and said downstream section of said valve seat and thereby prevent substantial inadvertent longitudinal movement of said pin so as to continuously retain said flange between said pin and said shoulder.

14. The check valve according to claim 13 wherein said hanger surface is disposed in a plane oriented parallel to a central longitudinal flow axis through said valve seat, and wherein said first retainer bore is oriented perpendicular to said hanger surface.

15. The check valve according to claim 14 further comprising a hanger recess defined in said hanger surface, and pivotable mounting means on said clapper for mounting said clapper in said hanger recess, wherein said hanger recess is open at said hanger surface to permit said pivotable mounting means and said clapper to be lifted out of said recess and withdrawn through said access port when said bonnet is removed, and wherein said stop means on said bonnet is disposed sufficiently proximate said hanger recess to prevent said pivotable mounting means from being dislodged from said hanger recess when said bonnet is in place over said access opening.

16. The check valve according to claim 15 further comprising sealing means for providing a pressure seal between said valve seat and said inlet port.

17. The check valve according to claim 16 wherein said valve seat includes an upstream cylindrical section extending upstream into said inlet port from said flange, and wherein said sealing means comprises an annular groove defined peripherally about said upstream cylindrical section, and an O-ring disposed in said groove.

18. The check valve according to claim 13 wherein said body portion has a second retainer bore defined entirely through said body portion from said hanger surface and opening into said seat retainer section at a second location just upstream of the downstream surface of said valve seat flange, wherein said first and second locations are disposed in a plane oriented perpendicular to a central longitudinal axis through said valve seat and are angularly spaced by less than 180° about that axis; and further comprising a second retainer pin slidably disposed in said second retainer bore and having a length greater than the length of said second retainer bore such that a first end of said second pin abuts said valve seat downstream section while a portion of the second pin retains said flange between the second pin and said shoulder, and such that a second end of said second pin extends beyond said hanger surface into adjacency with said stop means to prevent substantial inadvertent longitudinal movement of said second pin in said second retainer bore.

19. The check valve according to claim 18 wherein said hanger surface is disposed in a plane parallel to said longitudinal flow axis, wherein said first and second bores are oriented perpendicular to said hanger surface, and wherein said first and second bores are disposed symmetrically relative to said longitudinal flow axis.

20. The check valve according to claim 19 further comprising a hanger recess defined in said hanger surface, and pivotable mounting means on said clapper for mounting said clapper in said hanger recess, wherein said hanger recess is open at said hanger surface to permit said pivotable mounting means and said clapper to be lifted out of said recess and withdrawn through said access port when said bonnet is removed, and wherein said stop means on said bonnet is disposed sufficiently proximate said hanger recess to prevent said pivotable mounting means from being dislodged from said hanger recess when said bonnet is in place over said access opening.

21. The check valve according to claim 20 further comprising sealing means for providing a pressure seal between said valve seat and said inlet port.

22. The check valve according to claim 21 wherein said valve seat includes an upstream cylindrical section extending upstream into said inlet port from said flange, and wherein said sealing upstream cylindrical section, and an O-ring disposed in said groove.

23. The check valve according to claim 18 further comprising a hanger recess defined in said hanger surface, and pivotable mounting means on said clapper for mounting said clapper in said hanger recess, wherein said hanger recess is open at said hanger surface to permit said pivotable mounting means and said clapper to be lifted out of said recess and withdrawn through said access port when said bonnet is removed, and wherein said stop means on said bonnet is disposed sufficiently proximate said hanger recess to prevent said pivotable mounting means from being dislodged from said hanger recess when said bonnet is in place over said access opening.

24. The check valve according to claim 18 further comprising sealing means for providing a pressure seal between said valve seat and said inlet port.

25. The check valve according to claim 24 wherein said valve seat includes an upstream cylindrical section extending upstream into said inlet port from said flange, and wherein said sealing means comprises an annular groove defined peripherally about said upstream cylindrical section, and an O-ring disposed in said groove.

26. The method of retaining a removable valve seat in place in a valve body comprising the steps of:
 disposing one surface of a radially projecting flange of the valve seat against an annular shoulder in a flow passage of the valve;
 defining first and second retainer bores through an interior body portion of said valve such that one end of each bore opens into said flow passage adjacent a second surface of said flange facing opposite from said one surface, and such that a second end of each bore opens at a hanger surface disposed in proximity to an access port of said valve to render the bores both visible and accessible via said access port;
 slidably disposing first and second retainer pins in said first and second retainer bores, respectively, such that each pin abuts the valve seat periphery at one end and extends beyond said hanger surface at a second end, whereby a portion of each pin is positioned adjacent the second surface of the flange to axially retain the flange between said shoulder and said pin; and
 preventing inadvertent lengthwise retraction of said pins into said second end of said bores and out of adjacency with said flange by projecting a stop member from a cover of said access port into adjacent relation with the second ends of said pins.

* * * * *